United States Patent [19]
Kobayashi et al.

[11] 3,730,063
[45] May 1, 1973

[54] DUAL LIGHT-RESPONSIVE AUTOMATIC EXPOSURE CONTROL APPARATUS

[75] Inventors: Tatsuo Kobayashi, Kaizuka; Hiroshi Ueda, Nara, both of Japan

[73] Assignee: Minolta Camera Kabushiki Kaisha

[22] Filed: May 11, 1971

[21] Appl. No.: 142,156

[30] Foreign Application Priority Data

May 11, 1970  Japan ................................ 45/39878

[52] U.S. Cl. ................. 95/10 CT, 95/10 PO, 95/42, 95/53 EB
[51] Int. Cl. ............................................. G03b 7/08
[58] Field of Search .............. 95/10 C, 10 CE, 10 CT, 95/42, 53 E, 53 EA, 53 EB, 10 PO

[56] References Cited

UNITED STATES PATENTS

| 3,442,190 | 5/1969 | Erickson | 95/10 CT |
|---|---|---|---|
| 3,124,049 | 3/1964 | Ball | 95/10 CT |
| 3,468,233 | 9/1969 | Schmidt | 95/42 |
| 3,353,462 | 11/1967 | Suzuni | 95/10 CT |

Primary Examiner—Joseph F. Peters, Jr.
Attorney—Watson, Cole, Grindle & Watson

[57] ABSTRACT

Automatic exposure control is effected by measuring light passing through the objective lens both before and during exposure by using a combination of two light measuring elements. One light measuring element is mounted to receive light reflected from either a light shield member or the surface of the film and the other light measuring element is mounted behind the film and is responsive to light transmitted through the film during exposure. A switch enables selection of the one, or combination of the two, light measuring elements to account for the difference in reflection coefficients of different films.

11 Claims, 4 Drawing Figures

Patented May 1, 1973  3,730,063

DUAL LIGHT-RESPONSIVE AUTOMATIC EXPOSURE CONTROL APPARATUS

BACKGROUND OF THE INVENTION:

The present invention relates to a camera which automatically controls the shutter speed by measurement of the picture image light passing through the objective lens and more particularly, to such a camera wherein light measurement is effected even during an exposure to attain accurate exposure control regardless of the properties of the photosensitive film by using two light-receiving elements as the light measuring means.

A camera wherein light passes through the objective lens measures the light from a scene to be photographed and controls the exposure in accordance with the measured light value obtained, so that it has the advantage of controlling the exposure with coherent scene light. However, in the prior art the light measurement is performed by a light-receiving element disposed between the objective lens and the photosensitive film so that during exposure the light measurement is discontinued in order not to interfere with photographing. More specifically, the light-receiving element is positioned in the path of the picture image light prior to exposure to measure the light passing through the objective lens and then is removed from the picture image light ray path just before starting the exposure; therefore, the exposure is controlled in accordance with the measured light value stored just prior to exposure. In a single lens reflex camera a light-receiving element may be mounted on the movable mirror or in an optical finder system and the light rays are then reflected by the movable mirror. Therefore, in both cases light measurement is impossible since the movable mirror moves just before the exposure and accordingly the exposure must be controlled in accordance with the stored light value obtained prior to exposure.

In that type of camera requiring storage, however, there arises a drawback in that the exposure control device becomes complicated, since it needs for example, a storage capacitor and a mechanism for switching the device from photometry to an exposure control circuit. Additionally, there is a possibility that the exposure time is not correct because of the time interval between the light measurement and the actual instant of exposure. Particularly in outdoor photography, when some change in the brightness of an object occurs between the time of light measurement and the instant of exposure, error must arise in the exposure control.

In order to eliminate the aforementioned defects, the reflection coefficients or characteristics of photosensitive materials may be used as such reflection characteristics are invariably in the range of approximately 23 to 31 percent. Therefore, if in a camera provided with a focal plane shutter, the reflection characteristic of the shutter opening screen surface facing the objective lens is made equal to the reflection characteristic of the photo-sensitive material on the photo-sensitive side, the exposure time is controlled by continuous measurement of the reflected light rays from the front surface of the shutter opening screen and from the photosensitive side of the photosensitive material throughout the time before exposure to the time during exposure. Apparatus based on that concept is described in co-pending United States patent application Ser. No. 89,406 filed on Nov. 13, 1970 by the same inventors as this application.

According to the aforementioned invention, the measurement of incident light passing through the objective lens is carried out at the focal plane during the exposing period too and thereby the exposure time can be controlled continuously from a time before exposure to a time when the exposure is completed by using reflection characteristics of the front surface of the shutter opening screen and the photosensitive material. Thereby the disadvantages in controlling exposure time by measuring for light passing through an objective lens are essentially eliminated.

The apparatus of the aforementioned application is effective when using photosensitive materials having substantially equal reflection powers. There are some special photosensitive materials which have extraordinarily low reflection photosensitive. For example, a photosensitive material commercially named, Mini-Copy, has a reflection coefficient of 16 percent which is extremely low in comparison with the normal value of reflection coefficient ranging from 23 to 31 percent. Generally, the reflection characteristic depends on the thickness of the emulsion layer. In the case of special photosensitive materials in which the emulsion layer is made thin to increase the resolution coefficient, the reflection coefficient becomes lower than that of normal photosensitive materials.

Consequently, such a device, in which the exposure is controlled by measurement of the reflected light from the front surface of the shutter opening screen and successively from the photosensitive film surface, is not always applicable to every kind of photosensitive material.

OBJECT OF THE INVENTION

The primary object of the present invention is to provide, in a camera of the TTL type wherein light passing through the objective lens is measured light measuring structure which eliminates the prior defects mentioned above, and that always automatically produces an accurate exposure time by performing light measurement during exposure regardless of any difference in the reflection characteristics of the photosensitive materials used.

The present invention provides a camera which can automatically control the exposure time by making use of the fact that the sum of the reflection characteristics of the photosensitive film and the light transmissibility characteristic of photosensitive materials is nearly equal with respect to various materials, even though there is some variation in the reflection characteristics of photosensitive materials.

A feature of the present invention is the use of two light-receiving elements receptive to the light reflected from the front surface of the shutter opening screen or the photosensitive film surface and also to the light passing through the film so that a single camera operates with any kind of photosensitive material.

Another advantageous feature of the present invention is that a switching arrangement enables the shutter speed control circuit to be connected between either one or both of the light-receiving elements in accordance with the use of normal photosensitive materials or special photosensitive materials with low reflection characteristics.

Further, various objects of the present invention will be clarified by the embodiment to be described hereinafter.

SUMMARY OF THE INVENTION

The present invention relates to a camera in which two light-receiving elements are provided, in order to attain the above mentioned objects, by considering the fact that the sum of the light reflection and the light transmission coefficients of commercially available different photosensitive materials is nearly the same according to the results of actual measurements. The first light-receiving element is mounted outside of the picture image light rays passing through the objective lens of the camera and faces the photosensitive film surface to receive the reflected light from the opening screen of the focal plane shutter and from the photosensitive film surface. The second light-receiving element is mounted behind the photosensitive film so as to receive the light passing through the film. When the opening screen of the the focal plane shutter starts its motion, said the light-receiving elements measure both the reflected light from the opening screen or the photosensitive surface of the exposed film and the light passing through the photosensitive film, and thereby the exposure time is automatically controlled by accurately measuring the brightness of objects even when using photosensitive films with variously different reflection coefficients.

In a modification of the present invention, the light transmitted through the photosensitive material is lowered by using suitable means selected in accordance with the ratio of the light transmitted through the film, to the reflected light. When using regular photosensitive materials the light measuring element responsive to light transmitted through the film is removed from the shutter speed control circuit and when using special photosensitive materials with low light reflection coefficients the output of the light measuring element responsive to light transmitted through the film is introduced into the shutter speed control circuit by operating a switch.

DESCRIPTION OF THE PREFERRED EMBODIMENTS

By measuring the light reflection light transmission characteristics of the photosensitive materials commercially named Neo-Pan SS and Mini-Copy, it is found that Neo-Pan SS has a reflection coefficient of 29 percent, a light transmission coefficient of 10 percent, and Mini-Copy has a reflection coefficient of 16 percent, and a transmission coefficient of 24 percent. Accordingly, the sum of the light reflection and the light transmission coefficients of Neo-Pan SS is 39 percent and that of Mini-Copy 40 percent, which are almost equal.

By using that relationship which is common among various kinds of photosensitive materials, the present invention provides accurate exposure control even where special photo-sensitive materials are used by measuring the incident light on the focal plane and the light transmitted through the photosensitive material during the process of exposure.

Figure 1:
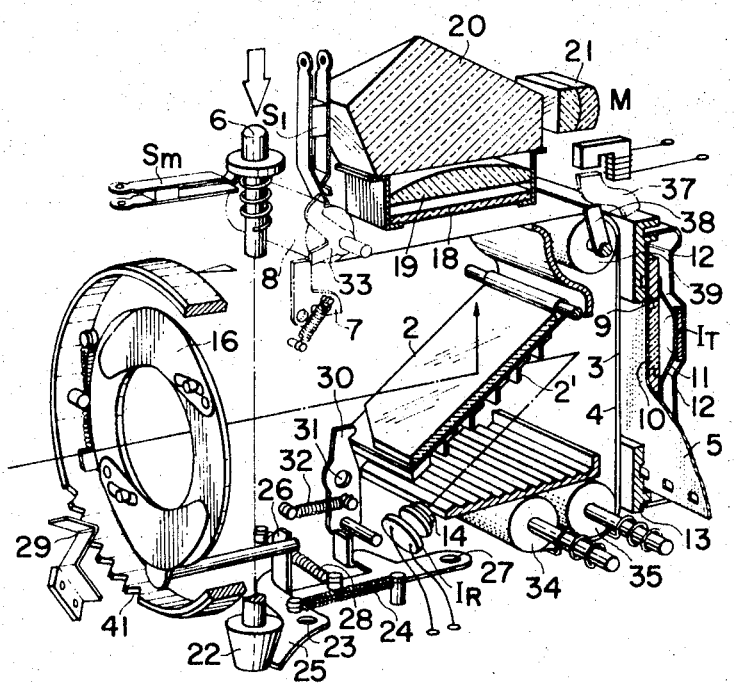
FIG. 1 is a perspective view of a longitudinal section showing the formation of the essential structure of an embodiment of a single reflex camera in accordance with the present invention.
Figure 2:
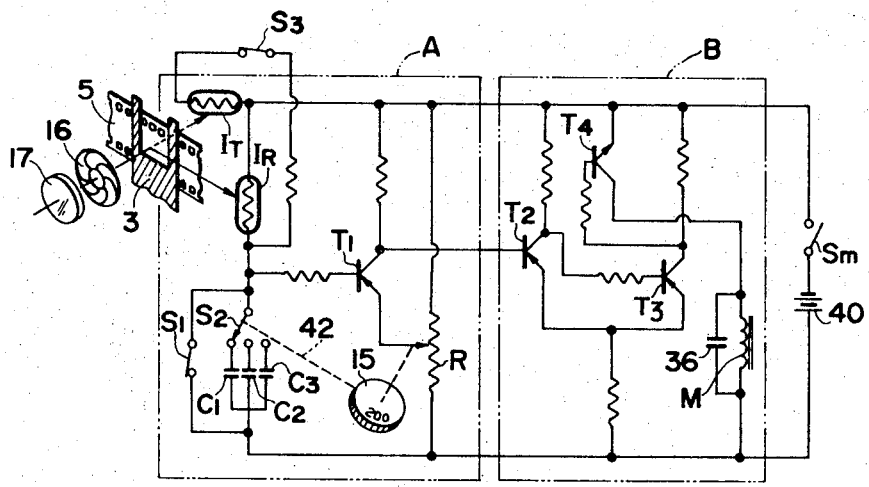
FIG. 2 shows the electric control circuit for that embodiment.

FIG. 1 shows an embodiment to which the present invention is applied in a single lens reflex camera provided with a focal plane shutter, wherein diaphragm blade 16 is held by preset diaphragm device 41 in the lens barrel mounted on the front of the camera body, and is disposed with respect to the pupil position of lens 17 as shown in FIG. 2. 2 is a movable mirror, which is in a viewing position at an angle of 45° relative to the optical axis as shown in FIg. 1 and reflects the incident light rays from lens 17 to focusing glass 18 for adjusting the focus. The image on focusing glass 18 is projected toward eyepiece 21 via condenser lens 19 and pentagonal prism 20.

The conical face 22 of release button 6 engages with release lever 25 supported on the camera body through pin hole 23 and has a clockwise turning tendency by means of spring 24. Conical face 22 turns release lever 25 counterclockwise when release button 6 is pressed down in the direction of the arrow. Preset diaphragm restraining lever 26 engages with release lever 25 and is supported rotatably on the camera body through pin hole 27 and has a clockwise turning tendency by means of spring 28. and, when restraining lever 26 is disengaged from release lever 25, it rotates to close down diaphragm 16 from a complete opening position to the diaphragm opening set by the operation of restraining member 29 of preset diaphragm device 41.

When preset diaphragm restraining lever 26 rotates, it engages mirror restraining lever 30 which is supported rotatably on the camera body through pin hole 31 and has a clockwise turning tendency by means of spring 32 to maintain engagement with turning plate 2' of movable mirror 2 in the viewing position at an angle of 45°. When struck by preset diaphragm restraining lever 26, however, mirror restraining lever 30 turns counterclockwise to release the restraining of movable mirror 2. Movable mirror 2 upon being released turns clockwise to the horizontal position by a spring not shown in the drawing.

Thereby, the picture image light rays passing through lens 17 are projected onto opening screen 3 of the focal plane shutter which is still in the process of closing.

In order to measure the light reflected from the focal plane, the first light-receiving element 1R is disposed at the rear of movable mirror 2, facing the exposure window of exposure frame 13 and being out of the optical path of the picture image light rays passing through lens 17.

Therefore, when movable mirror 2 is turned to the horizontal position as described above, the reflected light effected by opening screen 3 located so as to cover the exposure opening enters the first light-receiving element 1R through light-receiving-angle adjusting lens 14, and light-receiving element changes its resistance value corresponding to the intensity of the reflected light.

At the final stage of the turning of movable mirror 2 to the horizontal position, turning plate 2' comes into contact with opening screen restraining lever 7 to turn it counterclockwise so that opening screen pawl 33, integral with opening screen winding drum 8, is disengaged from opening screen restraining lever 7 and opening screen 3 is driven by take-up drum 34 thereof and at the same time opening screen pawl 33 opens timing switch S1 which has been closed up to that time.

As opening screen 3 starts to run, photosensitive film 5 is exposed to the picture image light passing through lens 17 and the light reflected from the photosensitive face of film 5 continuously is projected into the first light-receiving element 1R.

Figure 3:
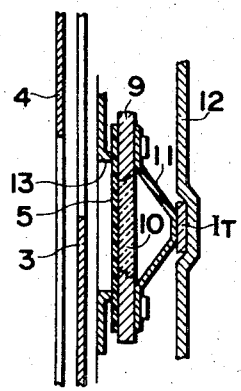
FIG. 3 is an enlarged side section view of the rear portion of the camera.

The second light-receiving element 1T is disposed behind photosensitive film 5 in order to measure light transmitted through photosensitive film as shown in FIG. 3. Specifically, scattering plate 10 is mounted on film pressing plate 9 in the back of sensitive 1T is mounted at the second light-receiving element 1T is mounted at the center of the conical light-receiving element holder 11. The reason that the second light-receiving element 1T is spaced from sensitive film 5 as shown in the drawing is to measure the light passing through the entire region of photosensitive film 5 and scattering plate 10 serves the same purpose. 12 is a rear cover.

Consequently, as mentioned previously, the light rays reflected from photosensitive film 5 is directed into light-receiving element 1R and at the same time the light rays passing through photosensitive film 5 passes into second light-receiving element 1T.

Therefore, in the present invention, providing that the reflection characteristic of the surface of opening screen 3 facing lens 17 is made approximately equal to the reflection characteristic of the photosensitive surface of regular films, the second light-receiving element 1T is left inactive and the exposure is controlled only by the first light-receiving element 1R. When using special photosensitive film with low reflection characteristics, the output of the second light-receiving element 1T can be introduced into the shutter speed control circuit by operating a switch. In this case, it is sufficient to lower the photometric sensitivity for light transmitted through the photosensitive film to one-half the photometric sensitivity for reflected light. For that purpose there are known devices wherein a light diminishing filter is inserted between the rear of the photosensitive film and the output of second light-receiving element 1T is electrically lower by one-half. In the case of a material commercially named Mini-Copy as mentioned before, by lowering the photometric sensitivity for the light transmitted through the film to one-half the light transmission coefficient will decrease to 12 percent in a relative sense so that the sum of 12 percent and 16 percent from the reflection coefficient is 28 percent which is approximately equal to the average range 23 to 31 percent of the reflection coefficient of the photosensitive surface of regular films.

And if the reflection coefficient of opening screen 3 of the focal plane shutter surface facing lens 17 has the same value as the sum of the reflection coefficient and the same through transmission coefficient as photosensitive films, the light quantity obtained by the first light-receiving element 1R from the light reflected at opening screen 3 of the focal plane shutter is always substantially equal, for a given picture image light, to the light quantity obtained by the first and the second light-receiving elements 1R and 1T from the light reflected from and also transmitted through the photosensitive film, even when the film has a different reflection coefficient. Thus, the difference in reflection coefficients of photosensitive films can always be compensated by the two light-receiving elements 1R and 1T.

Accordingly, regardless of the variations in the reflection coefficient of photosensitive films, detection of the appropriate lightness of objects and an accurate exposure control based on the detected value are made possible by the first light-receiving element 1R and the second light-receiving element 1T.

Next, with the reference to FIG. 2 showing the electric control circuit used with the embodiment of FIG. 1, the picture image light rays passing through lens 17 and diaphragm 16 enters first light-receiving element 1R after being reflected from opening screen 3 or from photosensitive film 5, and at the same time enters second light-receiving element 1T after passing through photosensitive film 5. Both the first light-receiving element 1R and the second light-receiving element 1T are connected to power source 40 and power switch Sm and connected also in series through change-over switch $S_2$ to one of delay capacitors $C_1$, $C_2$, $C_3$ arranged in parallel to each other. Timing switch S1 is connected in parallel to change-over switch $S_2$ and delay capacitors $C_1$, $C_2$, $C_3$ and the common connection point of first light-receiving element 1R, and change-over switch $S_2$ is connected to the base of transistor $T_1$ to form timer circuit A. Variable resistance R is an emitter resistance for transistor $T_1$, the resistance value of which is changed by film sensitivity dial 15 and coupling member 42 as shown in FIG. 2, and also changes over between respective delay capacitors $C_1$, $C_2$ and $C_3$.

In the switching circuit shown by broken line B in FIG. 2, transistor $T_2$ receives an an input the output of timer circuit A and forms a Schmitt trigger circuit together with transistor $T_3$. To the collector of transistor $T_3$ the base of amplifier transistor $T_4$ is connected, and electromagnet M for releasing the restraining of the closing screen and condenser 36 are connected in parallel to the collector of transistor T4. $S_3$ is a switch to connect or disconnect second light-receiving element 1T in parallel with first light-receiving element 1R.

As shutter release button 6 is pushed, main switch Sm is closed, opening screen 3 is released and timing switch $S_1$ is opened. Then with the electric current produced in first light-receiving element, onto which the picture image light is incident after being reflected by opening screen 3 or photosensitive film 5, and with the electric current produced in second light-receiving element 1T, into which the light transmitted through photosensitive film 5 is introduced, one of delay capacitors $C_1$, $C_2$, $C_3$ is charged. When the charge voltage reaches a certain set level, transistor $T_1$ becomes electrically conductive to operate switching circuit B and thereby electromagnet M is excited.

Just as electromagnet M is excited, closing screen restraining lever 37 is turned clockwise in FIG. 1 to release the restraining of closing screen pawl 38, so that closing screen winding drum 39, integral with closing screen pawl 38 is released and closing screen 4 is driven by closing screen take up drum 35 and the shutter is closed.

Therefore, when light rays of the picture image are reflected by closing screen 4, the exposure control is already completed so that there is no need to increase the reflection characteristic of closing screen 4. With the reflection coefficient of the opening screen of the focal plane shutter equal to that of the photosensitive surface side of the film, switch $S_3$ is opened when a regular photosensitive film is used, and on the contrary, is closed when using a photosensitive film of particularly low reflection coefficient so that the second light-receiving element 1T becomes connected in parallel to first light-receiving element 1R.

Figure 4:
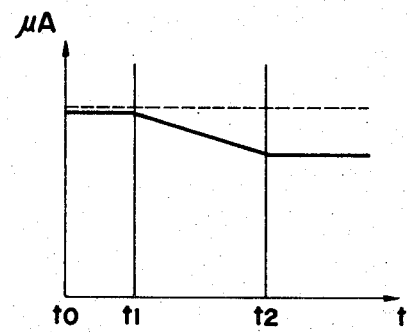
FIG. 4 is a diagram showing the change of the light quantity measured by the light-receiving element during the process of releasing the shutter as a function of time.

Now, consider the operation of a camera when using a low reflection coefficient film and a high light transmissibility coefficient such a material as a commercially named material, Mini-Copy. As the photosensitive surface of film 5 is not immediately exposed after opening screen 3 starts to run, first light-receiving element 1R receives reflected light from opening screen 3 as in the case of using a regular photosensitive film and light-receiving element 1T does not receive any light at all. As the photosensitive surface is further exposed with the movement of opening screen 3, the reflected light therefrom decreases and the reflected light from the photosensitive surface increases. Since the reflection coefficient of the photosensitive surface is lower than that of opening screen 3, the light quantity received by first light-receiving element 1R decreases, to a low value when the shutter is fully opened. The current-time characteristic is shown in FIG. 4. In FIG. 4, the abscissa shows the lapse of time from the instant opening screen 3 started running, $t_1$ being the beginning of the running of the opening screen and $t_2$ the instant at which the opening screen is fully opened the ordinate shows the current generated by the light-receiving element. In this figure, the solid line shows the change of current output with time from first light-receiving element 1R when using a special photosensitive film of low reflection coefficient. As the shutter opens, the light quantity received by second light-receiving element 1T gradually increases to become constant after the shutter is fully opened. Therefore, if the output ratio of first light-receiving element 1R to second light-receiving element 1T is chosen appropriately, the sum of both outputs, as shown by a dotted line in FIG. 4, is constant regardless of the amount of the shutter opening. If the reflection coefficient of the opening screen is equal to the reflection coefficient of regular photosensitive films, and when using such special photosensitive films as Mini-Copy in the usual type of camera lacking second light-receiving element 1T, the shutter speed is controlled by the output of first light-receiving element 1R as shown by the solid line in FIG. 4, and consequently the result the same is as if the object were dark and therefore it will have excessive exposure. The present invention, however, is provided with an improved device for correcting said such defects.

We claim:

1. In a photographic camera having light-responsive means for measuring scene light through an objective lens, a capacitor connected to said light responsive means to form an integrating circuit, a switching circuit responsive to said integrating circuit, and means driven by said switching circuit to initiate shutter closing after a delay period determined by said integrating circuit, the improvement wherein said light-responsive means comprises: a first photoconductive element mounted outside of the direct light path from said objective lens to the light sensitive film surface and responsive to light reflected from at least said light sensitive surface, and a second photoconductive element mounted for receiving light transmitted through said film.

2. A shutter control device as in claim 1, wherein the camera comprises a light shield member mounted between said objective lens and said film and movable for exposing said film, said light shield member having approximately the same light reflecting coefficient as said light sensitive film surface, and means for selectively connecting said second photoconductive element to said integrating circuit.

3. A shutter control device as in claim 1, wherein the reflecting coefficient of said light shield member is in the range of 23 to 31 percent.

4. A shutter control device as in claim 1, wherein the camera comprises a light shield member mounted between said objective lens and said film and movable for exposing said film, said light shield member having a light reflecting coefficient substantially equal to the sum of the light reflecting coefficient and light transmission coefficient of said film, and means for connecting said first and second photoconductive elements in parallel with one another to said capacitor.

5. A shutter control device as in claim 4, wherein the reflecting coefficient of said light shield member is approximately 40%.

6. In a photographic camera having an objective lens, a first shutter curtain for initiating exposure of a light sensitive material and having a light reflecting surface facing said objective lens, a second shutter curtain for terminating said exposure, light measuring means responsive to light passing through said objective lens, a capacitor connected to said light measuring means to form an integrating circuit, a switching circuit responsive to said integrating circuit, and means driven by said switching circuit to actuate said second shutter curtain after a delay period determined by said integrating circuit, the improvement wherein said light measuring means comprises a first photoconductive element mounted outside of the direct light path from said objective lens to said light sensitive material for receiving light reflected therefrom and/or said first shutter curtain light reflecting surface, and a second photoconductive element mounted to receive light transmitted through said light sensitive material.

7. An exposure control device as in claim 6, wherein said first shutter curtain light reflecting surface has approximately the same light reflecting coefficient as said light sensitive material, and means for selectively connecting said second photoconductive element to said integrating circuit.

8. An exposure control device as in claim 7, wherein said first shutter curtain light reflecting surface has a reflecting coefficient between 23 and 31 percent.

9. An exposure control device as in claim 8, further comprising means for compensating said second photoconductive element whereby the sum of the light reflecting and light transmission coefficients of said light sensitive material is substantially equal to said reflecting coefficient of said first shutter curtain light reflecting surface.

10. An exposure control device as in claim 7, wherein said first and second photoconductive elements are connectable in parallel with each other to said integrating circuit.

11. An exposure control device as in claim 6, wherein said first shutter curtain light reflecting surface has a light reflecting coefficient substantially equal to the sum of the reflecting and light transmission coefficients of said light sensitive material, and means for selectively connecting said first and second elements to said capacitor to add their outputs.

* * * * *